Figure 1:
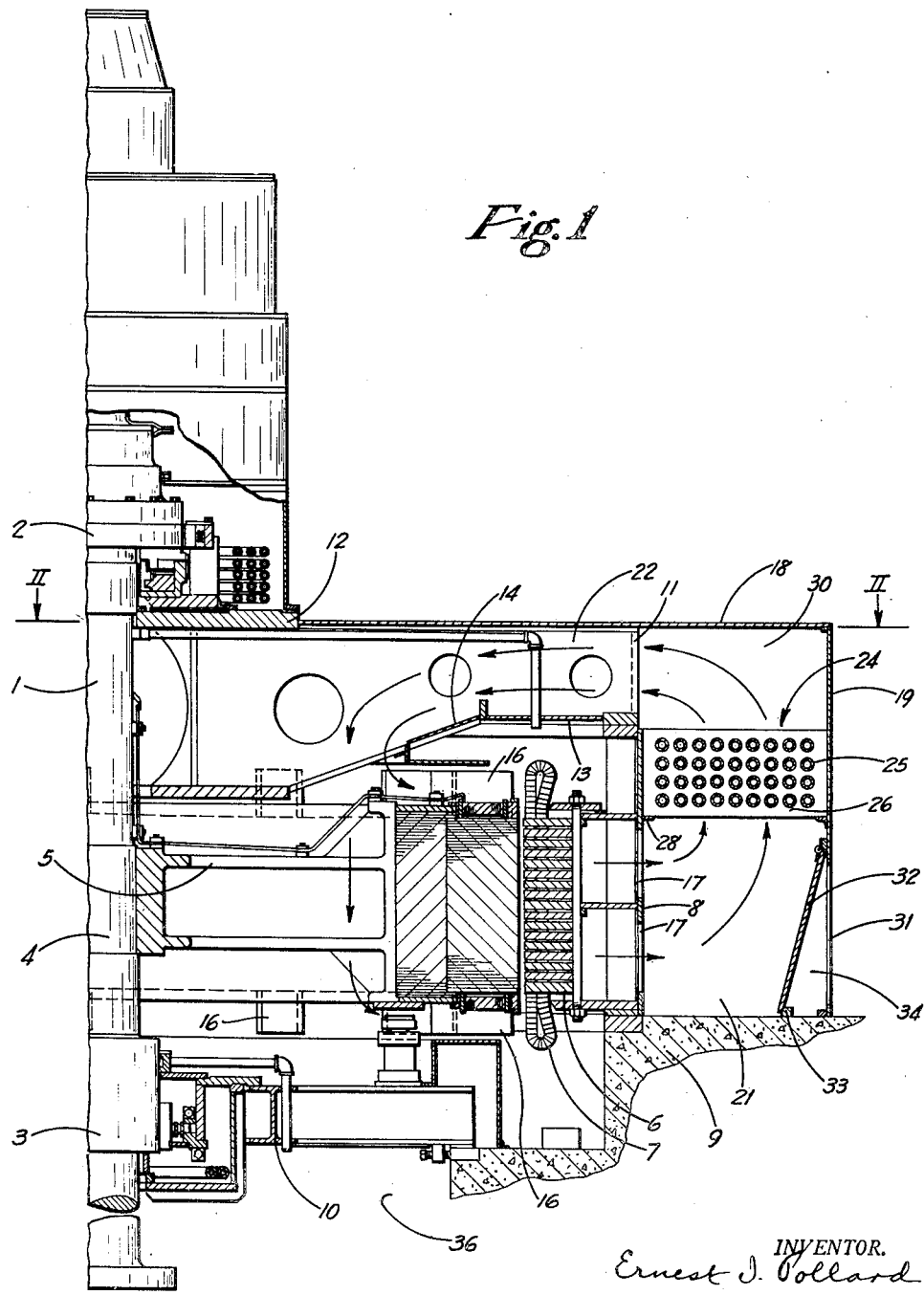

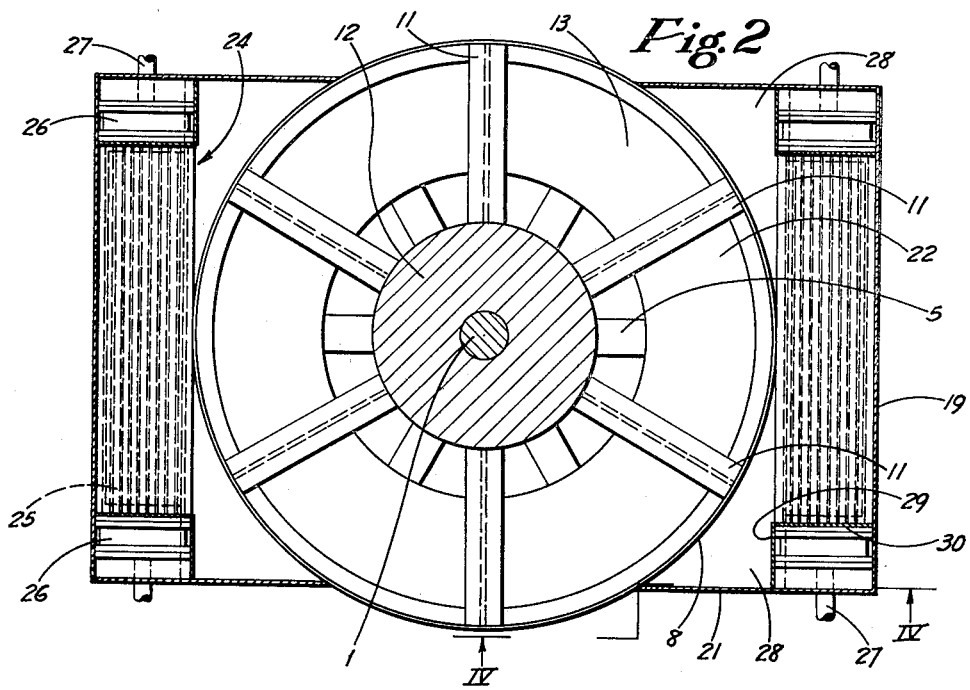
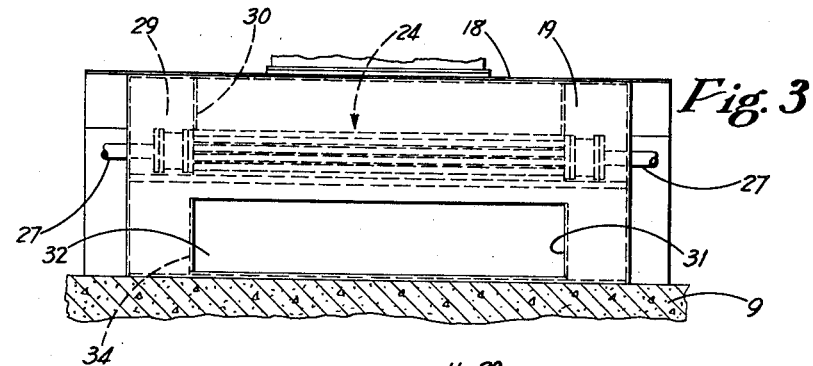
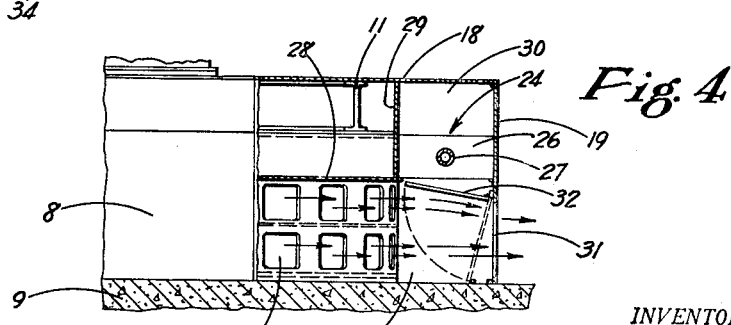

Patented Apr. 4, 1950

2,502,669

UNITED STATES PATENT OFFICE 2,502,669

ELECTRIC GENERATOR

Ernest I. Pollard, Ridgway, Pa., assignor to Elliott Company, Jeannette, Pa., a corporation of Pennsylvania Application February 13, 1948, Serial No. 8,071

3 Claims. (Cl. 171—252)

This invention relates to enclosed dynamo-electric machines, and is particularly applicable to vertical generators that are driven by water wheels.

It is customary practice to provide such a machine with a substantially airtight housing. As considerable heat is produced in the machine, it also is customary to mount fan blades on the rotor for circulating cooling air through the rotor and stator. Of course, this air rapidly becomes heated, so it is necessary to remove the heat from the air continuously if the recirculated air is to serve as a cooling medium. This is done by mounting coolers in the path of the air leaving the stator to cool the air before it returns to the rotor. Usually the heat removed from the circulating air in such a dynamo-electric machine has been wasted.

It is among the objects of this invention to provide an enclosed dynamo-electric machine which has a by-pass that will conduct the heated cooling air from the stator past one or more coolers to the outside of the machine where it will heat the surrounding room atmosphere during cold weather, and which has an adjustable closure for the by-pass so that some or all of the air can be compelled to pass through the coolers when it is not desired to use that air for space heating purposes.

In accordance with this invention a rotor of a dynamo-electric machine, such as a generator, is encircled by a stator and carries fan blades for blowing cooling air out through the stator. Walls define an inlet passage for air returning from outside the stator to a point adjacent the inner end of the fan blades. An enclosure, which is outside of the stator but in the path of heated air from it, is provided with an outlet allowing that air to escape to the area outside the generator in order to heat it. An air cooler associated with the enclosure has an inlet for receiving heated air from the stator and an outlet communicating with the inlet of the inlet passage. The generator also has an inlet for air to make up for that which escapes through the enclosure outlet. The latter is provided with a closure so that the heated air can be compelled to pass through the cooler to the inlet passage for recirculation through the generator. Preferably, the ductwork that conducts air to or from the cooler is in the form of a housing outside the stator. One or more air coolers are mounted in the housing in the path of all of the air flowing through the housing from the stator to the inlet passage. The housing has an air outlet communicating with the air inlet side of the cooler to enable the heated air to be drawn off before it can enter the cooler. If desired, however, the cooler inlet may be connected to an opening in the frame encircling the stator, and the air housing may be provided with a passage for conducting heated air past the cooler from another frame opening to the housing outlet.

Figure 5:
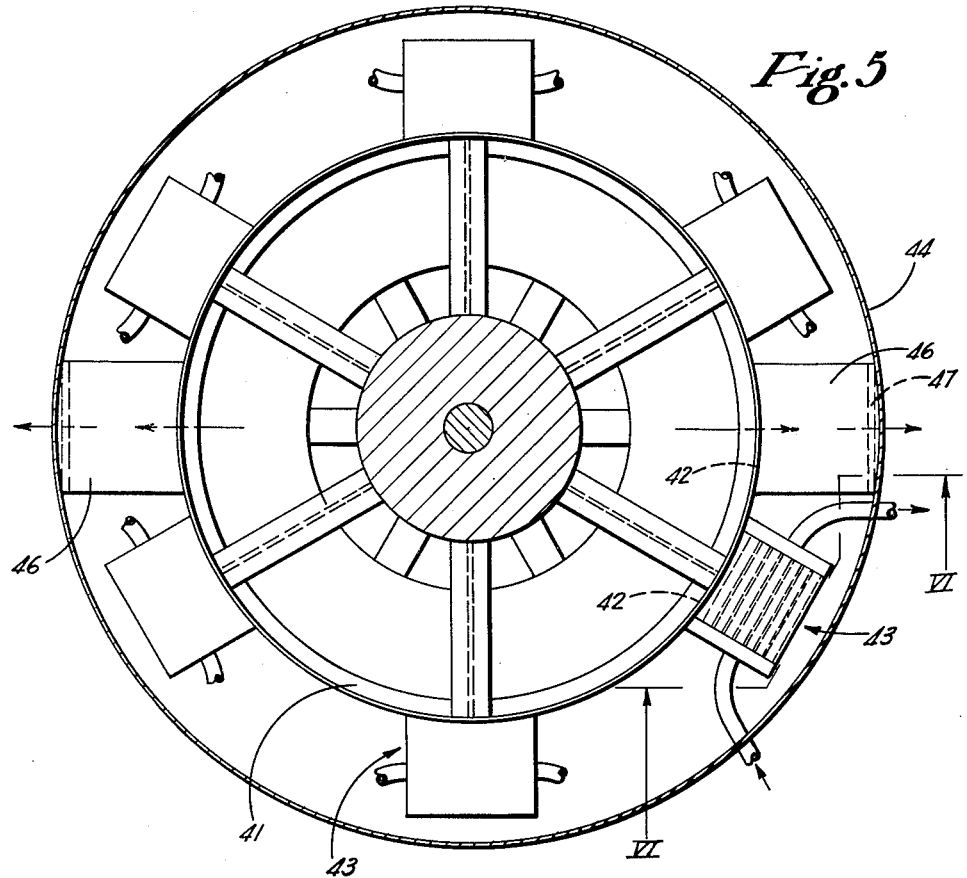
Figure 6:
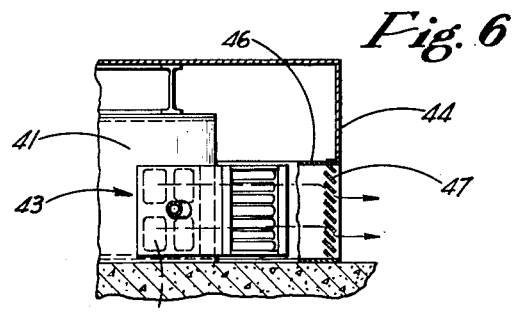

The invention is illustrated in the accompanying drawings, in which Fig. 1 is a side view of half of an electric generator, with part of it shown in vertical section; Fig. 2 is a reduced horizontal section of the entire generator taken on the line II—II of Fig. 1; Fig. 3 is an elevation of the central portion of the generator; Fig. 4 is a fragmentary vertical section taken on the line IV—IV of Fig. 2; Fig. 5 is a view, similar to Fig. 2, of a modification of this invention; and Fig. 6 is a fragmentary vertical section taken on the line VI—VI of Fig. 5.

Referring to Figs. 1 and 2 of the drawings, a vertical shaft 1 is rotatably mounted in suitable upper and lower bearings 2 and 3, and may be driven from below by a water wheel (not shown). A generator rotor 4 encircles the shaft and is rigidly connected to it by a spider 5. Encircling the rotor is a stator formed from the usual vertically spaced sets of punchings 6 and associated windings 7. The stator is supported by a cylindrical metal frame 8 that rests on a foundation 9 which also supports the lower bearing bracket 10 of the generator. Rigidly mounted on top of the stator frame is the upper bearing bracket which is formed from several I-beams 11 extending radially inward toward the center shaft. The inner ends of the beams are rigidly connected together by an annular plate 12 welded to their upper surfaces and encircling the shaft. The bottoms of the spaces between the outer end portions of the beams are closed by plates 13 and 14 resting on their lower flanges and extending inward to a point behind vertical fan blades 16 which are mounted on the top and bottom of the rotor near its periphery. These fan blades draw cooling air into the rotor and blow it across the rotor's heat dissipating surfaces and then out between the sets of stator punchings 6 and through circumferentially spaced pairs of openings 17 in the stator frame.

Mounted on top of the radial beams 11 of the upper bearing bracket is a metal plate 18 that encircles plate 12 and extends out beyond the ends of the beams at diametrically opposite sides of the generator to form the top walls of a pair of air housings. The parallel outer side walls 19 of the two housings are formed by vertical plates, and the housing and walls likewise are formed by vertical parallel plates 21 welded to the stator frame 8. Between the two housings the stator frame has no outlet openings like openings 17 in the housings. The inner wall of each housing is formed by the stator frame and the lower wall is formed by foundation 9. The top plate 18 and the plates 13 and 14 between the bottoms of beams 11 form the upper and lower walls, respectively, of an air passage 22 divided by the beams into sections having their inlets at the outer ends of the beams. Fan blades 16 draw cooling air through these passages.

In order to cool the air that has been heated in cooling the rotor and stator, a rectangular heat exchanger or cooler 24 is mounted in each air housing, where it extends lengthwise of the outer side wall 19 from one end wall 21 to the other. The coolers may be of any suitable design, the ones shown somewhat diagrammatically having horizontal water tubes 25 extending into headers 26 connected by feed pipes 27 to suitable apparatus for circulating cold water through the pipes. Each cooler is located above the outlets 17 in the stator frame and below the inlets to passage 22, and the triangular spaces between the cooler and frame 8 are closed by horizontal plates 28. The spaces above headers 26 are separated from passage 22 by vertical walls 29 and 30. Consequently, all of the air flowing from the stator back to the inlet passage must pass upward between the tubes of the coolers and give up its heat to the water flowing through those tubes. This cools the air before it again reaches the rotor.

The feature of this invention is that instead of wasting the heat picked up by the cooling air from the generator, the heat can be used to heat the room or building in which the generator is located. Accordingly, the outer side wall 19 of each air housing is provided below its cooler 24 with an outlet opening 31. This outlet may be closed by adjustable louvres, or by a door 32 that is hinged along its upper edge to the outer wall of the housing. The door preferably is inclined inward and downward when closed so that gravity will hold it against a bottom strip 33 and triangular end plates 34 that form a door frame. While the doors are closed, all of the air circulating through the generator flows up through the coolers and then down into the rotor and out through the stator to the air housings again. However, when the doors are opened by any suitable means, either manual or otherwise, some or all of the heated air by-passes the coolers by flowing under the raised doors, and it escapes through the housing outlets 31 to the area surrounding the generator, as shown in Fig. 4. The air heats that area and thereby saves fuel which otherwise would be necessary. By pulling the doors up against the coolers, practically all air flow through the coolers can be stopped. While the warm air is flowing out of the air housings it is necessary to supply other air to the generator to make up for what is leaving. This can be done through a controlled inlet 36 in the lower part of the generator, such as through the lower bearing bracket. If at all times all of the heated air is by-passing the cooler so that all of the cooling air must be taken in through the main inlet beneath the generator, operation of the cooler can be discontinued temporarily because it will not be serving any purpose.

In the modification of the invention shown in Figs. 5 and 6, the generator itself is the same as the one appearing in the other figures, except that the stator frame 41 has its outlet openings 42 arranged in groups all around it. Each of a number of the groups leads directly into a different cooler 43, of which several are located at circumferentially spaced intervals around the frame. The outlets of the coolers open into a common air housing 44 that encircles the stator frame. With this arrangement the warm air leaving the stator does not enter the housing until after the air has passed through the coolers and been cooled by them. To provide for heating the area surrounding the generator with heated air from the generator, radial conduits 46 are mounted in the air housing between some of the coolers. The inner ends of these conduits are connected directly to groups of openings 42 in the stator frame, while their outer ends are connected to outlets in the outer side wall of housing 44. Each housing outlet is provided with a suitable closure, such as a door or louvres 47 (Fig. 6) that can be opened and closed in any suitable manner. When closed, all of the heated air from the stator must pass through the coolers, after which it recirculates through the rotor and stator. There are no openings 42 in the stator frame except those communicating with the coolers and conduits 46. When the louvres are open, some of the warm air leaving the stator by-passes the coolers through conduits 46 and escapes into the surrounding atmosphere to heat it. In either embodiment of this invention more coolers may be used than are shown.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A dynamo-electric machine comprising a rotatable vertical shaft, a rotor encircling the shaft and carried by it, a stator encircling the rotor, a frame encircling the stator and adapted to rest on a foundation, a top plate spaced from the top of the frame to form an air inlet above the frame, an air housing mounted on the outside of the stator frame and communicating with said inlet, said frame being provided with an air outlet opening into the lower part of said housing, whereby air heated in passing through the stator can flow up through the housing from said outlet to said inlet for recirculation, an air cooler mounted in the housing between said outlet and inlet and having an air passage therethrough in the path of all of the air flowing to said inlet, the housing having an air outlet opening below the cooler, and a hinged door normally closing said opening but adapted to be swung inward and upward to substantially close said air passage and to permit heated air from the stator to by-pass the cooler and escape from the housing to heat an area outside of the machine.

2. A dynamo-electric machine comprising a rotatable shaft, a rotor encircling the shaft and carried by it, a stator encircling the rotor, a frame encircling the stator to support it and provided with radial openings, fan blades carried by the rotor for blowing cooling air out through the stator and said openings, walls defining an inlet passage for air leading from outside said frame to a point adjacent the inner ends of said blades, an air housing outside the stator frame communicating with the inlet of said passage, an air cooler mounted in the housing with its outlet opening into the housing, the inlet of the cooler being connected to some of said frame openings for receiving heated air from the stator, said housing having an outlet, a conduit in the housing for conducting heated air past the cooler from others of said frame openings to said housing outlet to heat an area outside of the machine, and a closure for the housing outlet to compel said heated air to pass through the cooler.

3. A dynamo-electric machine comprising a rotatable vertical shaft, a rotor encircling the shaft and carried by it, a stator encircling the rotor, a frame encircling the stator and provided with radial openings, fan blades carried by the rotor for blowing cooling air out through the stator and said openings, a housing encircling said frame and having an outer side wall extending above the top of the frame, a cover plate forming the top wall of the housing and closing the space above the rotor and stator, the space between the cover plate and the top of the frame forming an air inlet, a plurality of circumferentially spaced air coolers disposed in said housing with their outlets opening into the housing, the inlets of the coolers being connected to some of said frame openings for receiving heated air from the stator, said housing having a plurality of circumferentially spaced outlets in its outer side wall, conduits in the housing connecting the rest of said frame openings with said housing outlets, and adjustable closures for said conduits.

ERNEST I. POLLARD.

REFERENCES CITED

The following references are of record in the file of this patent:

UNITED STATES PATENTS

| Number | Name | Date |
| --- | --- | --- |
| 1,906,849 | Fleischmann | May 2, 1933 |

FOREIGN PATENTS

| Number | Country | Date |
| --- | --- | --- |
| 109,778 | Switzerland | May 1, 1925 |
| 862,255 | France | Nov. 30, 1940 |